US009007934B1

(12) United States Patent
Runge et al.

(10) Patent No.: US 9,007,934 B1
(45) Date of Patent: Apr. 14, 2015

(54) CONTROL SIGNALING BETWEEN VOIP PHONE AND COMPUTING DEVICE

(75) Inventors: Michael Runge, San Mateo, CA (US); Juan Vasquez, San Jose, CA (US)

(73) Assignee: Google Inc., Mountain View, CA (US)

( * ) Notice: Subject to any disclaimer, the term of this patent is extended or adjusted under 35 U.S.C. 154(b) by 495 days.

(21) Appl. No.: 13/362,188

(22) Filed: Jan. 31, 2012

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04L 12/46* | (2006.01) |

(52) U.S. Cl.
CPC ...................................... *H04L 12/46* (2013.01)

(58) Field of Classification Search
USPC .................. 370/260–261, 270, 252; 379/133, 379/142.06, 142.07, 258, 308, 373.05, 379/204.01
See application file for complete search history.

(56) References Cited

U.S. PATENT DOCUMENTS

| | | | |
|---|---|---|---|
| 7,075,921 B2 | 7/2006 | Siegrist et al. | |
| 7,167,451 B1 * | 1/2007 | Oran .............................. | 370/252 |
| 7,307,982 B2 | 12/2007 | Burritt et al. | |
| 7,542,460 B2 | 6/2009 | Kuwabara et al. | |
| 7,911,983 B2 | 3/2011 | Patel et al. | |
| 7,949,723 B2 | 5/2011 | Barazesh et al. | |
| 2004/0266421 A1 | 12/2004 | Kato et al. | |
| 2007/0248098 A1 | 10/2007 | Chen | |
| 2007/0263600 A1 | 11/2007 | Sutardja et al. | |
| 2007/0280200 A1 | 12/2007 | Patel | |
| 2008/0008162 A1 * | 1/2008 | Martinez et al. ............... | 370/352 |
| 2009/0129282 A1 * | 5/2009 | Lee et al. ....................... | 370/252 |
| 2009/0323912 A1 * | 12/2009 | Toner et al. ................. | 379/93.23 |
| 2012/0052852 A1 * | 3/2012 | Goldman ...................... | 455/418 |

OTHER PUBLICATIONS

VoIP Integration; Phone Remote 2.3 Installation and Administration Guide; Version 1006; Feb. 14, 2011.
http://en.wikipedia.org/wiki/Computer_telephony_integration; Computer Telephony Integration; pp. 1-3; last visited Jan. 19, 2012.
Cisco IP SoftPhone User Guide; Cisco IP SoftPhone Overview; Chapter 1; OL-2370-01; 2000-2002; pp. 1/1-1/14.
MITEL 3300 IP Communications Platform; MITEL 5330 IP and 5340 IP Phones User Guide; Sep. 2006.
VoIP Integration; Phone Remote 2.3 Remote Control Software for Cisco Phones; Overview; http://www.voipintegration.com/Software-Phone-Remote.aspx, 2011.

\* cited by examiner

*Primary Examiner* — Benjamin H Elliott, IV
(74) *Attorney, Agent, or Firm* — Leydig, Voit & Mayer, Ltd.

(57) ABSTRACT

Described are computer-based methods and apparatuses, including computer program products, for sharing control of a voice over internet protocol (VoIP) call. In some examples, the method includes establishing a direct connection between a VoIP endpoint device and a computing device associated with the VoIP endpoint device. The method further includes communicating, via the direct connection, VoIP control signaling between the VoIP endpoint device and the computing device. The method further includes modifying a VoIP call based on the VoIP control signaling.

24 Claims, 6 Drawing Sheets

CONTROL SIGNALING BETWEEN VOIP PHONE AND COMPUTING DEVICE

TECHNICAL FIELD

The disclosure relates generally to voice over internet protocol (VoIP) communications.

BACKGROUND

Generally, users in a VoIP environment utilize stand-alone VoIP devices to establish VoIP calls between the users. In some scenarios, the stand-alone VoIP devices are connected to a VoIP server for control of the VoIP calls by other devices. In these scenarios, the VoIP control signaling is generally not shared with the other devices, but is shared with the VoIP server. Thus, a need exists in the art for improved control signaling between VoIP phones and computing devices.

SUMMARY

One approach is a system that shares control of a voice over internet protocol (VoIP) call. The system includes a VoIP endpoint device configured to: establish a direct connection between the VoIP endpoint device and a computing device associated with the VoIP endpoint device, transmit VoIP control signaling to the computing device via the direct connection, wherein the VoIP control signaling is for a VoIP call between the VoIP endpoint device and another VoIP endpoint device, modify the VoIP control signaling based on a modification of the VoIP control signaling received from the computing device, and transmit the modified VoIP control signaling to a VoIP server independently of the computing device. The system further includes the computing device configured to: receive the VoIP control signaling from the VoIP endpoint device via the direct connection, and transmit the modification of the VoIP control signaling to the VoIP endpoint device via the direct connection. The system further includes the VoIP server configured to modify the VoIP call based on the VoIP control signaling received from the VoIP endpoint device.

Another approach is a voice over internet protocol (VoIP) endpoint device that includes a control share module configured to establish a direct connection between a VoIP endpoint device and a computing device associated with the VoIP endpoint device, wherein the direct connection is established without a relay through another device; a control signal module configured to communicate, via the direct connection, VoIP control signaling between the VoIP endpoint device and the computing device; and a control modification module configured to modify a VoIP call based on the VoIP control signaling.

Another approach is a method for sharing control of a voice over internet protocol (VoIP) call. The method includes communicating, via a direct connection, VoIP control signaling between a VoIP endpoint device and a computing device, wherein the direct connection is established without a relay through another device; and modifying a VoIP call based on the VoIP control signaling.

Another approach is a computing device for a voice over internet protocol (VoIP) system. The device includes a control signal module configured to communicate, via a direct connection, VoIP control signaling between a VoIP endpoint device and the computing device; a control modification module configured to transmit, via the direct connection, a modification of the VoIP control signaling for the VoIP call to the VoIP endpoint device; and a processor configured to process the VoIP control signaling for use in an application operating on the computing device.

In some examples, any of the approaches above can include one or more of the following features.

In some examples, the direct connection is established without a relay through the VoIP server.

In some examples, the direct connection is established without a relay through another device.

In some examples, the VoIP server is further configured to establish the VoIP call between the VoIP endpoint device and the other VoIP endpoint device.

In some examples, the modification of the VoIP call includes a modification of a VoIP call parameter, a modification of audio in the VoIP call, a modification of a hardware parameter for the VoIP endpoint device, or any combination thereof.

In some examples, the computing device is further configured to process the VoIP control signaling for use in an application operating on the computing device.

In some examples, the control modification module is further configured to modify VoIP call parameters, modify audio in the VoIP call, modify hardware parameters for the device, or any combination thereof.

In some examples, the device further includes a VoIP call module configured to transmit the VoIP control signaling to a VoIP server.

In some examples, the device further includes a VoIP audio module configured to transmit audio of the VoIP call to another VoIP endpoint device.

In some examples, the control signal module is further configured to transmit, via the direct connection, the VoIP control signaling to the computing device.

In some examples, the control signal module is further configured to receive from the computing device, via the direct connection, modifications of the VoIP control signaling.

In some examples, the device further includes a VoIP initiation module configured to establish the VoIP call with a second VoIP endpoint device.

In some examples, the method further includes establishing the direct connection between a VoIP endpoint device and a computing device associated with the VoIP endpoint device.

In some examples, the modification of the VoIP call includes modifying VoIP call parameters, modifying audio in the VoIP call, modifying hardware parameters for the VoIP endpoint device, or any combination thereof.

In some examples, the method further includes transmitting, via the VoIP endpoint device, the VoIP control signaling to a VoIP server.

In some examples, the transmitting the VoIP control signaling is independent of the computing device.

In some examples, the method further includes transmitting, via the VoIP endpoint device, audio of the VoIP call to another VoIP endpoint device.

In some examples, the transmitting the audio is independent of the computing device.

In some examples, the communicating VoIP control signaling further includes transmitting, via the direct connection, the VoIP control signaling from the VoIP endpoint device to the computing device.

In some examples, the communicating VoIP control signaling further includes receiving, via the direct connection, modifications of the VoIP control signaling from the computing device.

In some examples, the method further includes establishing the VoIP call between the VoIP endpoint device and a second VoIP endpoint device.

In some examples, the device further includes a control share module configured to establish the direct connection between the VoIP endpoint device and the computing device.

In some examples, the direct connection is established without a relay through another device.

The control signaling between VoIP phone and computing device systems and methods described herein (hereinafter "technology") can provide one or more of the following advantages. An advantage of the technology is the direct connection between the VoIP endpoint device and the computing device enables VoIP control signaling (e.g., VoIP call information, VoIP header, data associated with the VoIP call) to be utilized by the computing device (e.g., a customer database on the computing device, an audio translation application), thereby increasing the effective uses of the VoIP call (e.g., synchronization between customer portal and VoIP call, automatic audio insertion into the VoIP call, increase in productivity for call agents due to the reduced typing of customer information, decrease in customer complaints due to typographical errors in call agent input). Another advantage of the technology is the immediate control of phone functions on the endpoint device and the direct connection with computer applications on the computing device, which emulate first party entry into the endpoint device, thereby increasing the effective uses of the VoIP call. Another advantage of the technology is the syncing of the call with the computing device prevents control data from being shown on the incorrect computing device if the actual call is not on the endpoint device connected to the computing device, thereby reducing call errors.

Another advantage of the technology is the direct connection between the VoIP endpoint device and the computing device increases the available uses of the VoIP control signaling without synchronization through an external service, thereby reducing the costs to deploy and utilize external applications with VoIP calls. Another advantage of the technology is the direct connection between the VoIP endpoint device and the computing device enables the transfer of the VoIP call information, thereby increasing the functionality of the shared VoIP call control through the shared use of VoIP call information.

Other aspects and advantages of the present disclosure will become apparent from the following detailed description, taken in conjunction with the accompanying drawings, illustrating the principles of the disclosure by way of example only.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

The shared voice over internet protocol (VoIP) call control methods and apparatuses include technology that, generally, shares control of a VoIP call between a VoIP endpoint device (e.g., VoIP phone, VoIP software phone on a stand-alone device) and a computing device (e.g., a personal computer, a hand-held computer). The VoIP endpoint device and the computing device establish a direct connection (e.g., wired, wireless) between themselves to share the VoIP control signaling. The direct connection can be established without a relay between other devices (e.g., a VoIP server, a network router, a VoIP messaging server). The VoIP control signaling, generally, can include any type of information about the usage, establishment, control, and/or management of a telecommunication pathway (e.g., VoIP call pathway, VoIP to circuit switched call pathway) and/or telecommunication network (e.g., VoIP network, circuit switched network). The VoIP control signaling can include VoIP call information (e.g., caller identification, caller VoIP endpoint device identification, VoIP server information), VoIP headers (e.g., session initiation protocol (SIP) data, custom header), and/or any other information associated with the VoIP call (e.g., state change, agent registration, work mode, computer telephony integration (CTI) data).

For example, in operation, a user, via a VoIP phone, initiates a VoIP call with another user. The VoIP phone communicates with a VoIP server to initiate and establish the VoIP call with the other user, via the other user's phone (e.g., VoIP phone, a public switched telephone network (PSTN) phone). The VoIP phone establishes a direct connection with the user's personal computer. In this example, the VoIP phone is on the user's desk next to the personal computer and the VoIP phone and the personal computer are connected via a wired connection (e.g., universal serial bus (USB) connection, serial connection, parallel connection, Ethernet connection). The VoIP phone and the personal computer communicate VoIP control signaling (e.g., connection status, custom information about the call) between each other.

In this example, the VoIP phone communicates customer information using the VoIP control signals (e.g., customer information embedded in the VoIP control signals, customer information referenced in the VoIP control signals) and the computing device auto-populates the customer relationship application based on the customer information and/or customer information retrieved from a customer database. The personal computer can transmit VoIP control signaling (e.g., insertion of audio into the VoIP call, forwarding of VoIP call to another user) directly to the VoIP phone through the direct connection. The VoIP phone can modify the VoIP call based on the received VoIP control signaling. The communication of the VoIP control signaling via the direct connection advantageously enables the sharing of VoIP control signaling without the use of a relay (e.g., third party control server, a VoIP server), thereby decreasing the communication overhead (e.g., reduction in communication overhead, reduction in network latency, reduction in network congestion) and increasing the effective usage of the VoIP call (e.g., reduction in incorrect mappings between computing devices and endpoint devices, increase in call center operator efficiency).

As another example, in operation, a VoIP phone receives an inbound call from a VoIP server. The VoIP phone accepts the inbound call and establishes a direct connection with an associated computing device (e.g., a computing device designated by the user of the VoIP phone, a computing device designated in the inbound call). The VoIP phone transmits a VoIP control signal (e.g., a message that indicates that an inbound call from a particular person has been received, a packet with information about the inbound call) to the computing device.

In this example, an application (e.g., a customer relationship application, a customer repair application) operating on the computing device processes (e.g., extracts header information, retrieves customer account number from a database, retrieves customer information from a database based on header information) the VoIP control signal for the user to access the application. The user can modify the VoIP call utilizing the application (e.g., click on the insert standard audio button in the application, click on transfer to technical support button in the application). In this example, the user can insert audio into the VoIP call, via VoIP control signals transmitted to the VoIP phone, instructing the customer how to reset the customer's hardware device (e.g., phone, computing device). In some examples, the VoIP phone inserts the audio into the VoIP call. The direct connection of the VoIP control signals between the VoIP phone and the computing device advantageously enables the computing device to be involved in the call which decreases the call time and expenses related to the call.

Figure 1:
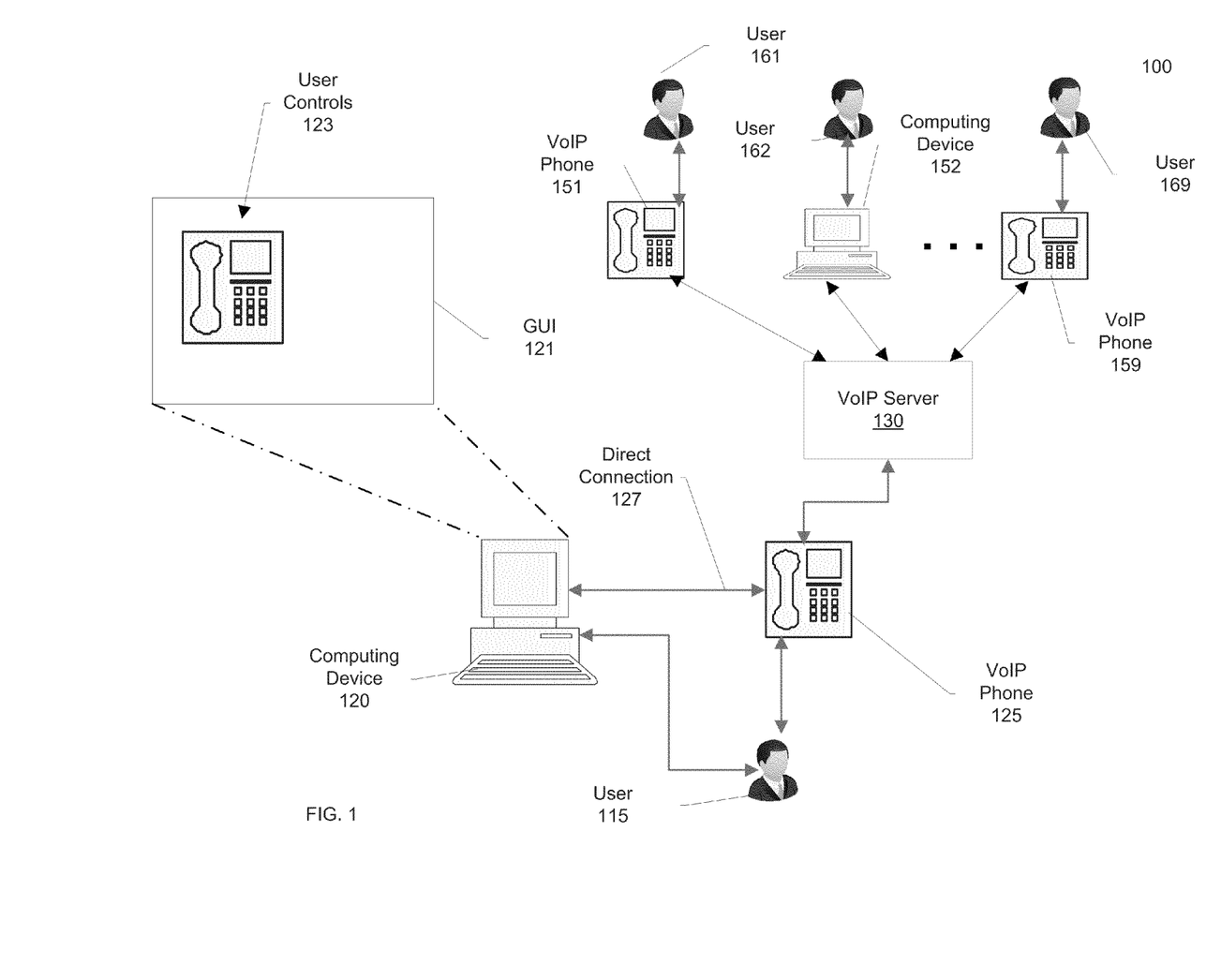
FIG. 1 is a diagram of a shared VoIP call control environment.

FIG. 1 is a diagram of a shared VoIP call control environment 100. The environment 100 includes a computing device 120, a VoIP phone 125, a VoIP server 130, and a plurality of VoIP endpoint devices, a VoIP phone 151, a computing device 152 through a VoIP phone 159. A user 115 can utilize the computing device 120 and/or the VoIP phone 125 to control, via a direct connection 127, a VoIP call between the VoIP phone 125 and one or more of the other VoIP endpoint devices 151, 152 through 159. The user 115 can utilize user controls 123 within a graphical user interface (GUI) 121 (e.g., chrome extension, java applet, stand-alone application) on the computing device 120 to control the VoIP call. Users 161, 162 through 169 utilize the VoIP endpoint devices 151, 152 through 159, respectively, for calls with other users (e.g., each other, user 115).

The user 115 can control a VoIP call by communicating VoIP control signaling between the computing device 120 and the VoIP phone 125. For example, the VoIP phone 125 transmits call prompts (in this example, beeps between the caller's touch tone input) to the computing device 120. An audio insertion module (not shown) on the computing device 120 monitors the call prompts and inserts audio (in this example, an advertisement) into the VoIP call via the direct connection 127. The audio insertion module inserts the audio by transmitting the audio to the VoIP phone 125. The VoIP phone 125 inserts the audio into the VoIP call based on the VoIP control signaling received from the computer device 120.

Although FIG. 1 illustrates one VoIP phone 125 connected to the VoIP server 130, the environment 100 can include any number (e.g., ten, one hundred) and/or any configuration (e.g., stand-alone VoIP phone, software-based VoIP on a handheld computing device) of VoIP phones connected, directly or indirectly, to the VoIP server. Although FIG. 1 illustrates the VoIP endpoint devices, the VoIP phone 151, the computing device 152 through the VoIP phone 159, the environment 100 can include any number (e.g., one thousand, ten thousand) and/or any configuration (e.g., connection with PSTN endpoint devices, an audio to text translation server) of endpoint devices.

Figure 2:
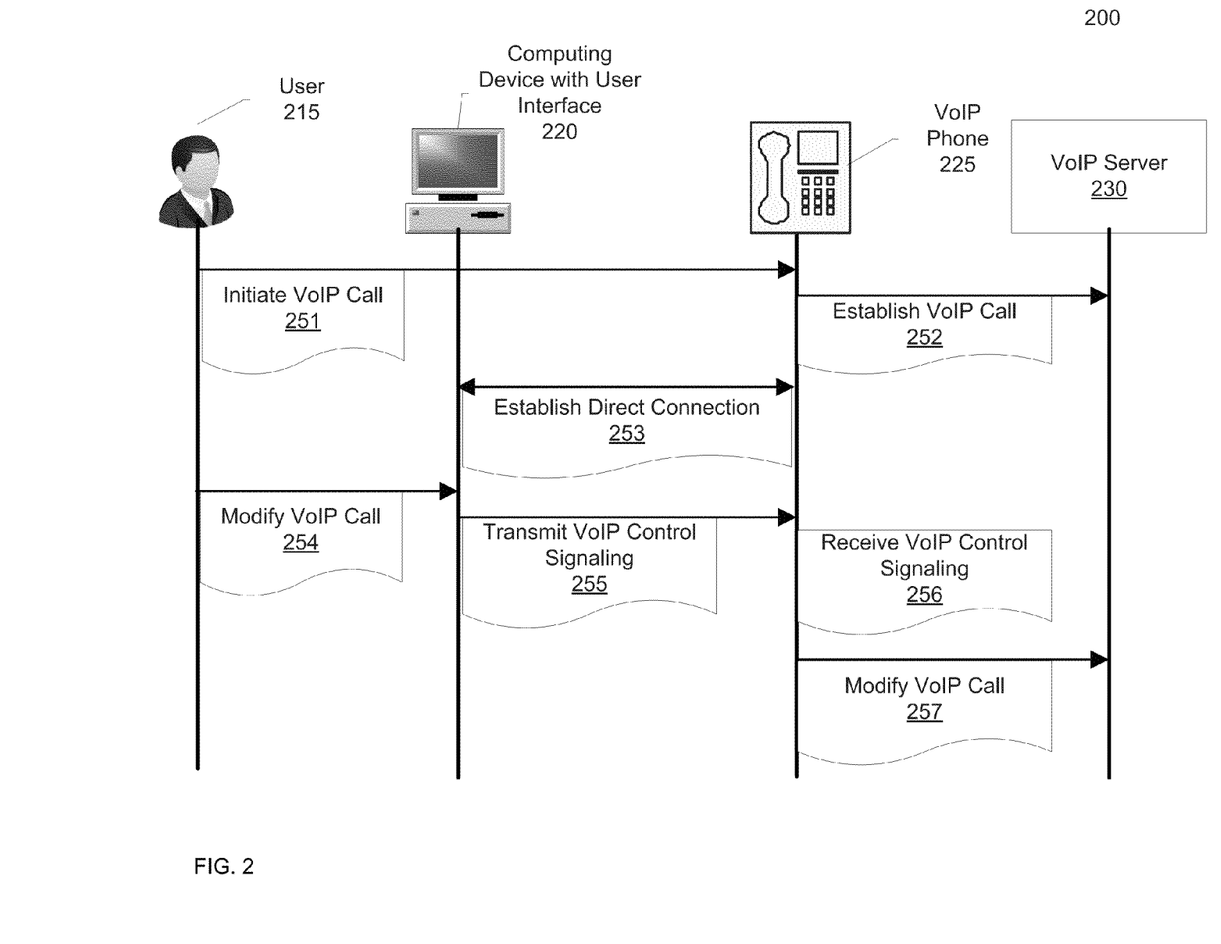
FIG. 2 is a diagram of a call sharing process.

FIG. 2 is a diagram of a call sharing process 200. The process 200 begins by a user 215 initiating (251) a VoIP call using a VoIP phone 225 (e.g., dials a number on the VoIP phone 225, enters in a speed dial code on the VoIP phone 225). In some examples, the user 215 initiates a VoIP call using a computing device 220 with a user interface. In this example, the user 215 can utilize an application (e.g., customer relationship management application) to call a customer via a direct connection between the computing device 220 and the VoIP phone 225, call management application to initiate a call based on voice prompts from the user 215) to initiate the VoIP call.

The VoIP phone 225 establishes (252) the VoIP call based on the request from the user 215 to initiate the VoIP call by communicating with a VoIP server 230. The establishment of the VoIP call can include the setup of the VoIP call between the VoIP phone 225 and another VoIP endpoint device (e.g., setup of VoIP call utilizing SIP messages, setup of VoIP call utilizing the VoIP server as an internet protocol (IP) private branch exchange (PBX)). In some examples, the establishment of the VoIP call includes the connection with an endpoint device connected to a PSTN, a PBX, and/or any other type of non-VoIP network.

The computing device 220 and/or the VoIP phone 225 establish (253) a direct connection between each other. In some examples, the VoIP phone 225 establishes (253) the direct connection at the initiation of a VoIP call. In some examples, the computing device 220 establishes (253) the direct connection at the start-up of an application (e.g., customer management application, audio configuration application) operating on the computing device 220. In some examples, the computing device 220 can record the VoIP call utilizing an application operating on the computing device 220. In some examples, the computing device 220 can translate the VoIP call utilizing a translation application operating on the computing device 220.

The user 215 modifies (254) the VoIP call by utilizing the user interface on the computer device 220. For example, the user 215 selects a user control to insert an advertisement into the VoIP call via the user interface. As another example, the user 215 adjusts an audio setting for the VoIP call via the user interface.

The computing device 220 transmits (255) VoIP control signaling to the VoIP phone 225 to control the VoIP call. In some examples, the user's modification of the VoIP call is embedded into SIP signaling for the transmission to the VoIP phone 225. In this example, the computing device 220 generates the SIP signaling based on the user's modification. In some examples, the user's modification of the VoIP call is forwarded to the VoIP phone 225 without modification. In this example, the direct connection is a forwarding of information from the computing device 220 to the VoIP phone 225.

The VoIP phone 225 receives (256) the VoIP control signaling and modifies (257) the VoIP call based on the VoIP control signaling by communicating with the VoIP server 230. In some examples, the VoIP phone 225 processes the VoIP control signaling received from the computing device 220 to generate VoIP control signaling for transmission to the VoIP server 230. In some examples, the VoIP phone 225 forwards the VoIP control signaling received from the computing device 220 to the VoIP server 230. In some examples, the VoIP phone 225 modifies the VoIP call directly without communication with the VoIP server 230. In some examples, the VoIP phone 225 modifies the VoIP call by communicating with the other VoIP endpoint device without communication with the VoIP server 230. In some examples, the VoIP phone 235 modifies the VoIP directly, by communicating with the other VoIP endpoint device, and/or by communicating with the VoIP server 230.

Figure 3:
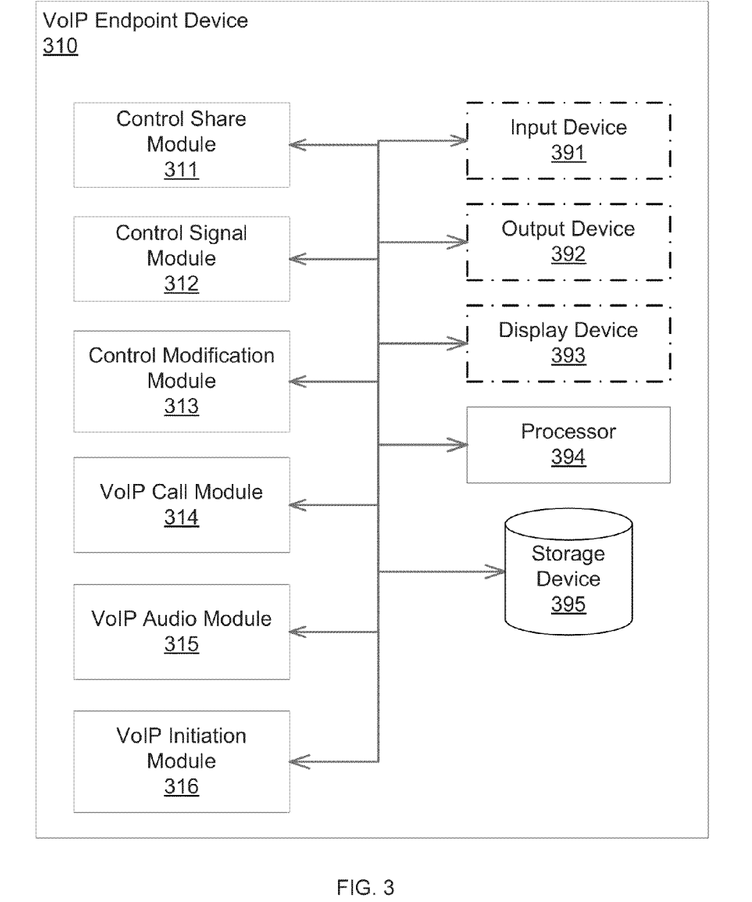
FIG. 3 is a diagram of a VoIP endpoint device.

FIG. 3 is a diagram of a VoIP endpoint device 310 (e.g., stand-alone hardware-based VoIP phone, separate software-based VoIP phone). The VoIP endpoint device 310 includes a control share module 311, a control signal module 312, a control modification module 313, a VoIP call module 314, a VoIP audio module 315, a VoIP initiation module 316, an input device 391, an output device 392, a display device 393, a processor 394, and a storage device 395. The input device 391, the output device 392, and the display device 393 are optional components of the VoIP endpoint device 310. The modules and devices described herein can, for example, utilize the processor 394 to execute computer executable instructions and/or the modules and devices described herein can, for example, include their own processor to execute computer executable instructions (e.g., an encryption processing unit, a field programmable gate array processing unit). It should be understood the VoIP endpoint device 310 can include, for example, other modules, devices, and/or processors known in the art and/or varieties of the illustrated modules, devices, and/or processors.

The control share module 311 establishes a direct connection between the VoIP endpoint device 310 and a computing device (e.g., the computing device 410 in FIG. 4) associated with the VoIP endpoint device 310. The direct connection can include a wired connection and/or a wireless connection (e.g., wifi, Bluetooth). For example, the direct connection is a cable operating the firewire protocol between the VoIP endpoint device 310 and the computing device. As another example, the direct connection is wifi connection between the VoIP endpoint device 310 with a USB cable to a wifi transceiver and the computing device with a built-in wifi transceiver.

In some examples, the direct connection is established without a relay through another device (e.g., VoIP server, external signaling server). The direct connection between the VoIP endpoint device 310 and the computing device advantageously enables the communication of information (in this example, VoIP control signaling) without the overhead of a separate protocol and translation as needed by another device. In other words, the direct connection increases the effective uses of the VoIP call by increasing the speed and amount of information communicated between the VoIP endpoint device 310 and the computing device, because of the decreased communication overhead (i.e., no network overhead) and direct communication path (i.e., no conflicts).

The control signal module 312 communicates, via the direct connection, VoIP control signaling between the VoIP endpoint device 310 and the computing device. In some examples, the control signal module 312 transmits, via the direct connection, the VoIP control signaling to the computing device. In some examples, the control signal module 312 receives from the computing device, via the direct connection, modifications of the VoIP control signaling. For example, the control signal module 313 transmits custom headers with agent work modes (e.g., high priority, active) from the VoIP endpoint device 310 to the computing device for use by an application operating on the computing device. In this example, the application operating on the computing device can utilize the agent work mode to enter an operational mode (e.g., only answer high priority calls, answer all calls).

The control modification module 313 modifies a VoIP call based on the VoIP control signaling. In some examples, the control modification module 413 modifies VoIP call parameters (e.g., increases buffer, receives call information), modifies audio in the VoIP call (e.g., removes audio, inserts audio), and/or modifies hardware parameters for the device (e.g., increases volume, decreases gain, changes network address, server configuration). For example, the control modification module 313 can transfer the VoIP call to another user based on information in the application operating on the computing device (in this example, transfer a customer's call and the customer information from billing support to hardware support automatically). As another example, the control modification module 313 can insert audio instructions on how to reset a hardware device based on a user's request for the instructions.

The VoIP call module 314 transmits the VoIP control signaling to a VoIP server. For example, the VoIP call module 314 translates the modifications of the VoIP call received from the computing device into a SIP message for communication to the VoIP server. The VoIP audio module 315 transmits audio of the VoIP call to another VoIP endpoint device. For example, the VoIP audio module 315 communicates the audio packets from the VoIP endpoint device 310 to the other VoIP endpoint device. The VoIP initiation module 316 establishes the VoIP call with a second VoIP endpoint device. The VoIP initiation module 316 can establish the VoIP call utilizing a VoIP serve and/or any other type of call initiation process (e.g., communication with a PBX, communication with PSTN).

The input device 391 receives information associated with the VoIP endpoint device 310 from a user (not shown) and/or another computing system (not shown). The input device 391 can include, for example, a keyboard and/or a scanner. The output device 392 outputs information associated with the VoIP endpoint device 310 (e.g., information to a printer (not shown), information to a speaker).

The display device 393 displays information associated with the VoIP endpoint device 310 (e.g., status information, configuration information, graphical representation). The processor 394 executes the operating system and/or any other computer executable instructions for the VoIP endpoint device 310 (e.g., executes applications).

The storage device 395 stores configuration information and/or call configuration. The storage device 395 can include a plurality of storage devices and/or the VoIP endpoint device 310 can include a plurality of storage devices (e.g., a call configuration storage device, an audio storage device). The storage device 395 can include, for example, long-term storage (e.g., a hard drive, a tape storage device, flash memory), short-term storage (e.g., a random access memory, a graphics memory), and/or any other type of computer readable storage.

Figure 4:
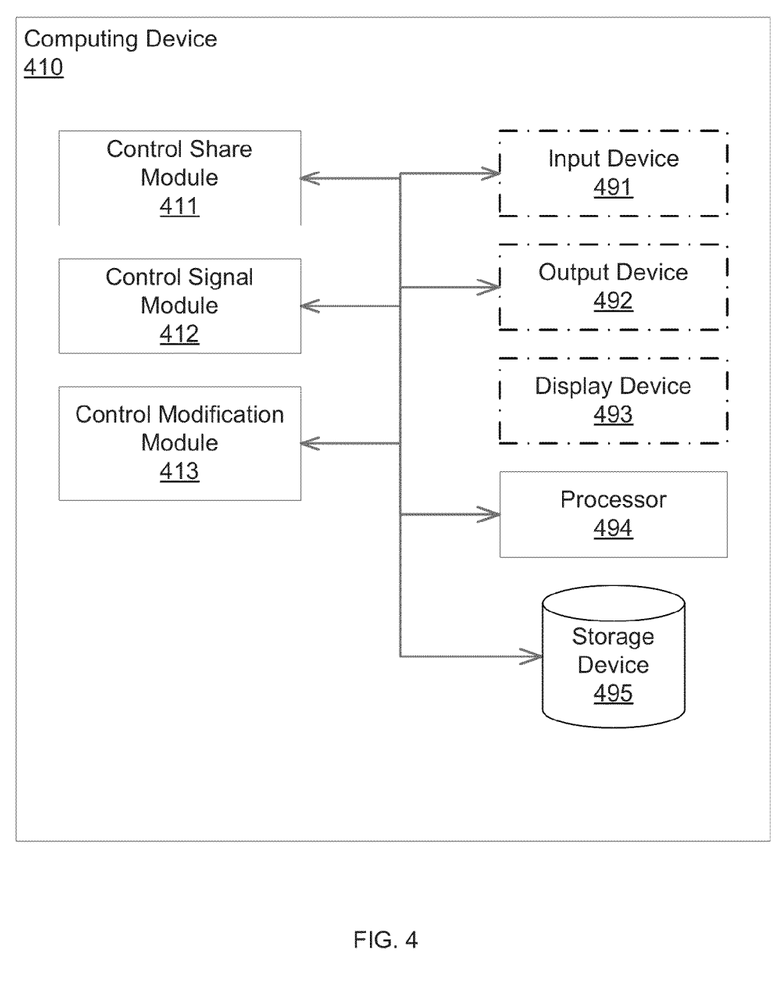
FIG. 4 is a diagram of a computing device.

FIG. 4 is a diagram of a computing device 410 (e.g., stand-alone computer, hand-held computer). The computing device 410 includes a control share module 411, a control signal module 412, a control modification module 413, an input device 491, an output device 492, a display device 493, a processor 494, and a storage device 495. The input device 491, the output device 492, and the display device 493 are optional components of the computing device 410. The modules and devices described herein can, for example, utilize the processor 494 to execute computer executable instructions and/or the modules and devices described herein can, for example, include their own processor to execute computer executable instructions (e.g., an encryption processing unit, a field programmable gate array processing unit). It should be understood the computing device 410 can include, for example, other modules, devices, and/or processors known in the art and/or varieties of the illustrated modules, devices, and/or processors.

The control share module 411 establishes a direct connection between a VoIP endpoint device and the computing device 410. For example, the control share module 411 establishes the direct connection when an application on the computing device 410 starts operation. As another example, the control share module 411 establishes the direct connection when a user initiates a call using an application on the computing device 410 (in this example, a customer relationship application that initiates a call to an existing customer utilizing the customer's contact information).

The control signal module 412 communicates, via the direct connection, VoIP control signaling between the VoIP endpoint device and the computing device. The control signal module 412 can communicate any type of VoIP control signaling (e.g., information embedded in a SIP packet, information embedded in a transmission control packet (TCP)). The control modification module 413 transmits, via the direct connection, a modification of the VoIP control signaling for the VoIP call to the VoIP endpoint device.

The input device 491 receives information associated with the computing device 410 from a user (not shown) and/or another computing system (not shown). The input device 491 can include, for example, a keyboard and/or a scanner. The output device 492 outputs information associated with the computing device 410 (e.g., information to a printer (not shown), information to a speaker).

The display device 493 displays information associated with the computing device 410 (e.g., status information, call information, graphical representation). The processor 494 executes the operating system and/or any other computer executable instructions for the computing device 410 (e.g., executes applications).

The storage device 495 stores call information and/or call configuration. The storage device 495 can include a plurality of storage devices and/or the computing device 410 can include a plurality of storage devices (e.g., a call configuration storage device, a voice storage device). The storage device 495 can include, for example, long-term storage (e.g., a hard drive, a tape storage device, flash memory), short-term storage (e.g., a random access memory, a graphics memory), and/or any other type of computer readable storage.

Figure 5:
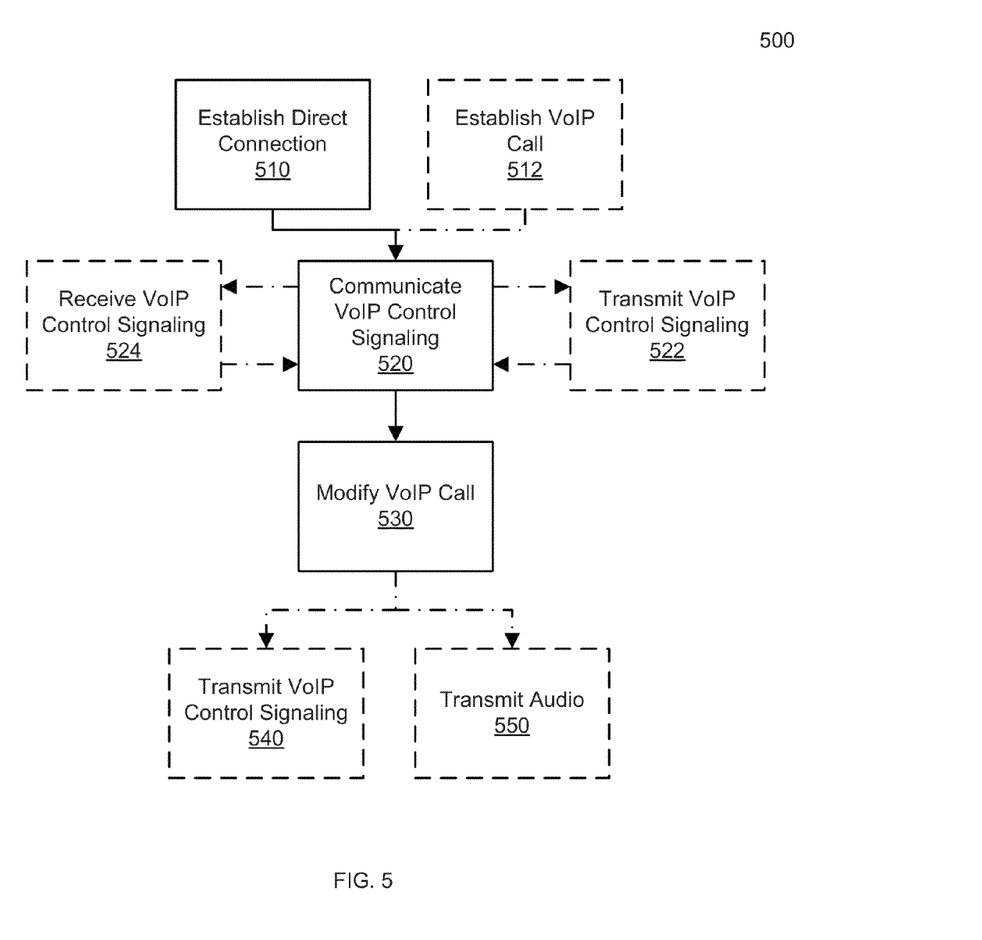
FIG. 5 is a flowchart of a call sharing process.

FIG. 5 is a flowchart of a call sharing process 500 utilizing, for example, the VoIP endpoint device 310 of FIG. 3. The control share module 311 establishes (510) a direct connection between a VoIP endpoint device and a computing device associated with the VoIP endpoint device. The control signal module 312 communicates (520), via the direct connection, VoIP control signaling between the VoIP endpoint device and the computing device. The control modification module 313 modifies (530) a VoIP call based on the VoIP control signaling.

In some examples, the VoIP call module 314 transmits (540), via the VoIP endpoint device, the VoIP control signaling to a VoIP server. In some examples, the VoIP call module 314 transmits (540) the VoIP control signaling independently of the computing device.

In some examples, the VoIP audio module 315 transmits (550), via the VoIP endpoint device, audio of the VoIP call to another VoIP endpoint device. In some examples, the VoIP audio module 315 transmits (550) the audio independently of the computing device. In some examples, the control modification module 313 modifies (530) the VoIP call by modifying VoIP call parameters, modifying audio in the VoIP call, and/or modifying hardware parameters for the VoIP endpoint device.

In some examples, the control signal module 312 transmits (522), via the direct connection, the VoIP control signaling from the VoIP endpoint device to the computing device. In some examples, the control signal module 312 receives (524), via the direct connection, modifications of the VoIP control signaling from the computing device. In some examples, the VoIP initiation module 316 establishes (512) the VoIP call between the VoIP endpoint device 310 and another VoIP endpoint device (e.g., the VoIP phone 151 of FIG. 1).

Figure 6:
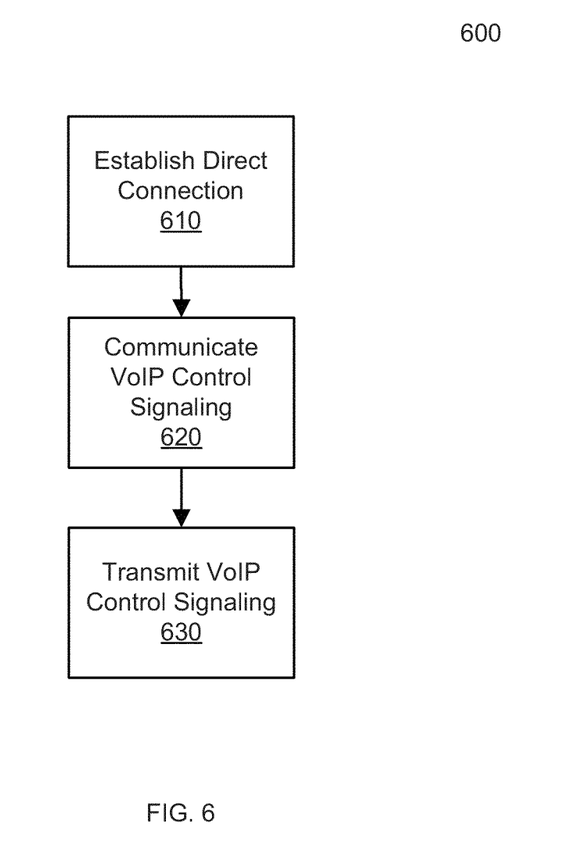
FIG. 6 is a flowchart of a call sharing process.

FIG. 6 is a flowchart of a call sharing process 600 utilizing, for example, the computing device 410 of FIG. 4. The control share module 411 establishes (411) a direct connection between a VoIP endpoint device and a computing device associated with the VoIP endpoint device. The control signal module 412 communicates (620), via the direct connection, VoIP control signaling between the VoIP endpoint device and the computing device. The control modification module 413 transmits (630), via the direct connection, a modification of the VoIP control signaling for the VoIP call to the VoIP endpoint device.

In some examples, the direct connection is established without a relay through another device. In some examples, the modification of the VoIP control signaling includes a request to modify VoIP call parameters, a request to modify audio in the VoIP call, and/or a request to modify hardware parameters for the VoIP endpoint device.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the disclosure by operating on input data and generating output. Method steps can also be performed by special purpose logic circuitry and/or an apparatus can be implemented on special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from, and/or can transfer data to one or more mass storage devices for storing data (e.g., magnetic, magneto-optical disks, optical disks, etc.).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD- ROM disks. The processor and the memory can be supplemented by, and/or incorporated in special purpose logic circuitry.

To provide for interaction with a user, the above-described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, provide feedback to the user in any form of sensory feedback (e.g., visual feedback, auditory feedback, or tactile feedback). Input from the user can, for example, be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Google Chrome available from Google Inc., Mozilla® Firefox available from Mozilla Corporation). The mobile computing device includes, for example, a device utilizing an Android operating system.

Comprise, include, and/or plural forms of each are open-ended and include the listed parts and can include additional parts that are not listed. And/or is open-ended and includes one or more of the listed parts and combinations of the listed parts.

One skilled in the art will realize the disclosure may be embodied in other specific forms without departing from the spirit or essential characteristics thereof. The foregoing embodiments are therefore to be considered in all respects illustrative rather than limiting of the disclosure described herein. Scope of the disclosure is thus indicated by the appended claims, rather than by the foregoing description, and all changes that come within the meaning and range of equivalency of the claims are therefore intended to be embraced therein.

What is claimed is:

1. A voice over internet protocol (VoIP) system, the system comprising:
    a VoIP endpoint device configured to:
        establish a direct connection between the VoIP endpoint device and a computing device associated with the VoIP endpoint device,
        transmit VoIP control signaling to the computing device via the direct connection, wherein the VoIP control signaling is for a VoIP call between the VoIP endpoint device and another VoIP endpoint device,
        modify the VoIP control signaling based on a modification of the VoIP control signaling received from the computing device, and
        transmit the modified VoIP control signaling to a VoIP server independently of the computing device;
    the computing device configured to:
        receive the VoIP control signaling from the VoIP endpoint device via the direct connection, and
        transmit the modification of the VoIP control signaling to the VoIP endpoint device via the direct connection; and
    the VoIP server configured to modify the VoIP call based on the VoIP control signaling received from the VoIP endpoint device.

2. The system of claim 1, wherein the direct connection is established without a relay through the VoIP server.

3. The system of claim 1, wherein the direct connection is established without a relay through another device.

4. The system of claim 1, wherein the VoIP server is further configured to establish the VoIP call between the VoIP endpoint device and the another VoIP endpoint device.

5. The system of claim 1, wherein the modification of the VoIP call comprises a modification of a VoIP call parameter, a modification of audio in the VoIP call, a modification of a hardware parameter for the VoIP endpoint device, or any combination thereof.

6. The system of claim 1, wherein the computing device is further configured to process the VoIP control signaling for use in an application operating on the computing device.

7. A voice over internet protocol (VoIP) endpoint device, the VoIP endpoint device comprising at least one processor and a processor-readable medium having processor-executable instructions stored thereon, the processor-executable instructions including a plurality of modules, the modules including:
    a control share module configured to establish a direct connection between the VoIP endpoint device and a computing device associated with the VoIP endpoint device, wherein the direct connection is established without a relay through another device;
    a control signal module configured to communicate, via the direct connection, VoIP control signaling between the VoIP endpoint device and the computing device;

a control modification module configured to modify a VoIP call based on the VoIP control signaling; and a VoIP call module configured to transmit the VoIP control signaling to a VoIP server independently of the computing device.

8. The device of claim 7, wherein the control modification module is further configured to modify VoIP call parameters, modify audio in the VoIP call, modify hardware parameters for the device, or any combination thereof.

9. The device of claim 7, further comprising a VoIP audio module configured to transmit audio of the VoIP call to another VoIP endpoint device.

10. The device of claim 7, wherein the control signal module is further configured to transmit, via the direct connection, the VoIP control signaling to the computing device.

11. The device of claim 7, wherein the control signal module is further configured to receive from the computing device, via the direct connection, modifications of the VoIP control signaling.

12. The device of claim 7, further comprising a VoIP initiation module configured to establish the VoIP call with a second VoIP endpoint device.

13. A method for sharing control of a voice over internet protocol (VoIP) call, the method comprising:

communicating, via a direct connection, VoIP control signaling between a VoIP endpoint device and a computing device, wherein the direct connection is established without a relay through another device;

modifying a VoIP call based on the VoIP control signaling; and transmitting, via the VoIP endpoint device, the VoIP control signaling to a VoIP server independently of the computing device.

14. The method of claim 13, further comprising establishing the direct connection between a VoIP endpoint device and a computing device associated with the VoIP endpoint device.

15. The method of claim 13, wherein the modification of the VoIP call comprises modifying VoIP call parameters, modifying audio in the VoIP call, modifying hardware parameters for the VoIP endpoint device, or any combination thereof.

16. The method of claim 13, further comprising transmitting, via the VoIP endpoint device, audio of the VoIP call to another VoIP endpoint device.

17. The method of claim 16, wherein the transmitting the audio is independent of the computing device.

18. The method of claim 13, wherein communicating VoIP control signaling further comprises transmitting, via the direct connection, the VoIP control signaling from the VoIP endpoint device to the computing device.

19. The method of claim 13, wherein communicating VoIP control signaling further comprises receiving, via the direct connection, modifications of the VoIP control signaling from the computing device.

20. The method of claim 13, further comprising establishing the VoIP call between the VoIP endpoint device and a second VoIP endpoint device.

21. A computing device for a voice over internet protocol (VoIP) system, the device comprising:

a control signal module configured to communicate, via a direct connection, VoIP control signaling between a VoIP endpoint device and the computing device;

a control modification module configured to transmit, via the direct connection, a modification of the VoIP control signaling for a VoIP call to the VoIP endpoint device to enable the VoIP endpoint device to transmit the modified VoIP control signaling to a VoIP server independently of the computing device; and a processor configured to process the VoIP control signaling for use in an application operating on the computing device.

22. The device of claim 21, further comprising a control share module configured to establish the direct connection between the VoIP endpoint device and the computing device.

23. The device of claim 21, wherein the direct connection is established without a relay through another device.

24. The device of claim 21, wherein the direct connection is established without a relay through the VoIP server.

* * * * *